(12) United States Patent
Roach et al.

(10) Patent No.: US 9,573,671 B1
(45) Date of Patent: Feb. 21, 2017

(54) FABRIC DIFFUSER FOR HIGH FLOWRATE INFLATION

(71) Applicant: Google Inc., Mountain View, CA (US)

(72) Inventors: Kevin Roach, San Jose, CA (US);
Pamela R. Desrochers, Redwood City, CA (US); Peter I. Capraro, San Franciso, CA (US); Evan Chambers, San Jose, CA (US)

(73) Assignee: X Development LLC, Mountain View, CA (US)

( * ) Notice: Subject to any disclaimer, the term of this patent is extended or adjusted under 35 U.S.C. 154(b) by 259 days.

(21) Appl. No.: 14/145,287

(22) Filed: Dec. 31, 2013

(51) Int. Cl.
B64B 1/62 (2006.01)
A63H 27/10 (2006.01)

(52) U.S. Cl.
CPC ......... B64B 1/62 (2013.01); *A63H 2027/1033* (2013.01)

(58) Field of Classification Search
CPC ........ Y10T 137/3584; B64B 1/40; B64B 1/58; A63H 2027/1033
USPC .............................. 137/223, 231; 244/31, 98
See application file for complete search history.

(56) References Cited

U.S. PATENT DOCUMENTS

| | | |
|---|---|---|
| 2,635,835 A | 4/1953 | Dungan et al. |
| 2,764,369 A | 9/1956 | Melton |
| 2,931,597 A | 4/1960 | Moore, Jr. |
| 2,967,677 A | 1/1961 | Winzen et al. |
| 3,080,138 A * | 3/1963 | Church .............. B64B 1/62 244/31 |
| 3,712,326 A * | 1/1973 | Thacker ........... F16K 15/20 137/223 |
| 3,827,635 A * | 8/1974 | Krakowski ........ B05B 1/005 137/223 |
| 3,844,449 A * | 10/1974 | Alter ................. F41H 9/10 222/175 |
| 4,174,082 A | 11/1979 | Eshoo |
| 4,215,834 A | 8/1980 | Dunlap |
| 4,262,864 A | 4/1981 | Eshoo |
| 4,711,416 A * | 12/1987 | Regipa ............... B64B 1/60 244/126 |
| 4,991,617 A * | 2/1991 | Butler ............... B63C 9/24 137/223 |
| 5,098,329 A * | 3/1992 | Tseng ............... A63H 27/10 446/221 |

(Continued)

OTHER PUBLICATIONS

International Searching Authority, International Search Report and Written Opinion for PCT/US2013/020525 mailed Apr. 22, 2013, 16 pages.

(Continued)

*Primary Examiner* — Benjamin P Lee
(74) *Attorney, Agent, or Firm* — McDonnell Boehnen Hulbert & Berghoff LLP

(57) ABSTRACT

An inflation diffuser including a non-rigid first section having a passageway for the passage of lift gas passing through a fill port positioned on a balloon envelope, a porous and non-rigid second section attached to the non-rigid first section, wherein the porous and non-rigid second section is comprised of a mesh material, wherein the non-rigid first section is less porous than the porous and non-rigid second section, and wherein the porous and non-rigid second section is not in contact with the balloon envelope at the end of an inflation process to direct lift gas towards the center of, and away from, the balloon envelope.

19 Claims, 9 Drawing Sheets

(56) References Cited

U.S. PATENT DOCUMENTS

| | | | |
|---|---|---|---|
| 5,988,677 A * | 11/1999 | Adomeit | B60R 21/205 280/736 |
| 6,494,756 B2 * | 12/2002 | Michaud | B63C 9/24 441/41 |
| 6,540,178 B1 | 4/2003 | Hillsdon | |
| 7,567,779 B2 | 7/2009 | Seligsohn et al. | |
| 7,568,656 B2 | 8/2009 | Handley | |
| 7,686,668 B1 * | 3/2010 | Butler | A63H 27/10 239/1 |
| 7,981,470 B1 * | 7/2011 | Butler | A63H 27/10 427/220 |
| 8,967,533 B2 * | 3/2015 | DeVaul | B64B 1/40 244/96 |
| 8,978,693 B2 * | 3/2015 | Frayne | F16K 15/20 137/512 |
| 9,027,877 B1 * | 5/2015 | Brookes | B64B 1/58 137/223 |
| 9,033,274 B2 * | 5/2015 | DeVaul | B64B 1/62 244/31 |
| 2007/0063489 A1 | 3/2007 | Dinsdale et al. | |
| 2007/0175517 A1 * | 8/2007 | Wu | F16K 15/147 137/231 |
| 2008/0272233 A1 | 11/2008 | Marlin | |
| 2009/0294576 A1 | 12/2009 | LaForge | |
| 2009/0315350 A1 * | 12/2009 | Allen | E01H 1/1206 294/1.3 |
| 2010/0071771 A1 * | 3/2010 | Chan | B64B 1/40 137/1 |
| 2011/0155260 A1 * | 6/2011 | Huang | F04B 33/005 137/231 |
| 2014/0124616 A1 * | 5/2014 | Greco | B64B 1/40 244/31 |
| 2014/0158823 A1 * | 6/2014 | Smith | B64B 1/44 244/1 A |
| 2014/0209184 A1 * | 7/2014 | Frayne | F16K 15/20 137/223 |
| 2014/0353424 A1 * | 12/2014 | Ratner | B64B 1/62 244/98 |
| 2015/0021427 A1 * | 1/2015 | Heppe | B64B 1/40 244/2 |
| 2015/0225060 A1 * | 8/2015 | Ratner | B64B 1/62 244/98 |
| 2015/0266559 A1 * | 9/2015 | Roach | B64B 1/42 244/31 |

OTHER PUBLICATIONS

Kerzhanovich et al., "Breakthrough in Mars Balloon Technology," Cospar Balloon Technology Conference, 2002, pp. 1-23.

* cited by examiner

FABRIC DIFFUSER FOR HIGH FLOWRATE INFLATION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon inflation diffuser is provided that includes a first section that is made of a non-rigid and non-porous material. The first section extends into a porous and non-rigid second section that is made of a mesh material that allows for lift gas to flow through the non-rigid mesh material into the balloon envelope to inflate the balloon envelope. The second section of mesh material is not in contact with the balloon envelope at the end of an inflation process and directs lift gas towards the center of, and away from, the balloon envelope material.

In a further aspect, an inflation diffuser is provided that includes a non-rigid first section having a passageway for the passage of lift gas passing through a fill port positioned on a balloon envelope, a porous and non-rigid second section attached to the non-rigid first section, wherein the porous and non-rigid second section is comprised of a mesh material, wherein the non-rigid first section is less porous than the porous and non-rigid second section, and wherein the porous and non-rigid second section is not in contact with the balloon envelope at the end of an inflation process to direct lift gas towards the center of, and away from, the balloon envelope.

In another aspect, an inflation diffuser is provided including a non-porous and non-rigid first section having a passageway for the passage of lift gas passing through a fill port positioned on a balloon envelope, the first section extending three inches or more within the balloon envelope, a porous and non-rigid second section attached to the first section, wherein the second section is comprised of a mesh material that comprises holes having a diameter on the order of 1 millimeter in size, wherein the second section has a round shape having a diameter of 12 inches or more in an uninflated state, and wherein the porous and non-rigid second section is not in contact with the balloon envelope at the end of an inflation process to direct lift gas towards the center of, and away from, the balloon envelope.

In another aspect, a method of inflating a balloon envelope is provided including the steps of positioning a balloon inflation diffuser within a balloon envelope, the balloon inflation diffuser having a non-rigid first section having a passageway for the passage of lift gas passing through a fill port positioned on a balloon envelope, a porous and non-rigid second section attached to the non-rigid first section, wherein the porous and non-rigid second section is comprised of a mesh material, wherein the non-rigid first section is less porous than the porous and non-rigid second section, causing lift gas to flow through the fill port and the non-rigid first section of the balloon inflation diffuser and into the porous second section of the balloon inflation diffuser, and causing the lift gas to flow through the mesh material of the porous and non-rigid second section such that the mesh material is not in contact with the balloon envelope at the end of an inflation process to direct lift gas towards the center of, and away from, the balloon envelope.

In a further aspect, a system may include: (a) a means for positioning a balloon inflation diffuser within a balloon envelope, the balloon inflation diffuser having a non-rigid first section having a passageway for the passage of lift gas passing through a fill port positioned on a balloon envelope, a porous and non-rigid second section attached to the non-rigid first section, wherein the porous and non-rigid second section is comprised of a mesh material, wherein the non-rigid first section is less porous than the porous and non-rigid second section, (b) means for causing lift gas to flow through the fill port and the non-rigid first section of the balloon inflation diffuser and into the porous second section of the balloon inflation diffuser, and (c) means for causing the lift gas to flow through the mesh material of the porous and non-rigid second section such that the mesh material is not in contact with the balloon envelope at the end of an inflation process to direct lift gas towards the center of, and away from, the balloon envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
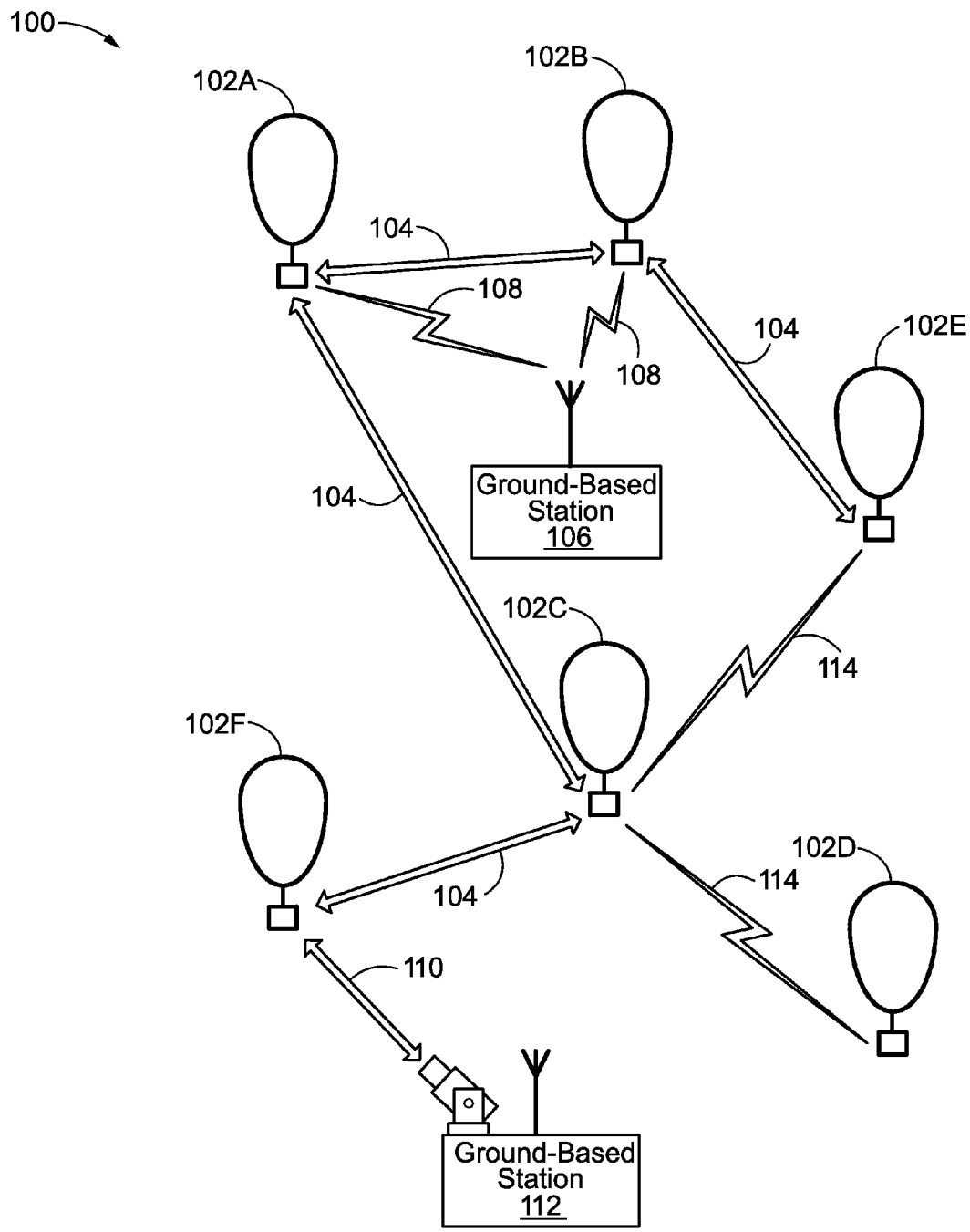
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments may help to provide or otherwise relate to a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location. Note, however, that example embodiments may be implemented in other scenarios that do not relate to a balloon network.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Various types of balloon systems may be incorporated in an exemplary balloon network. In an exemplary embodiment, such high-altitude balloons may include an envelope and a payload, and along with various other components.

The balloons used in the balloon network may be quite large, and may contain on the order of 80 cubic meters of lift gas. To provide buoyancy, the balloon envelope or ballonet within the balloon envelope may be filled with a lift gas, such as helium or hydrogen. For a variety of reasons it may be desirable to quickly inflate the balloon envelopes (or ballonets) with the lift gas. For example, under windy conditions it is beneficial to quickly inflate the balloon envelope to reduce the flagging or vibrating of the balloon envelope from the wind that may cause damage to the balloon envelope. Or if a large number of balloons are being deployed it is desirable to quickly fill the balloon envelopes for launch. Other examples are also possible.

In some implementations, the balloons may be quickly inflated at a high flow rate of 16 cubic meters of lift gas per minute, so that the balloon envelope can be inflated in approximately five minutes. However, the high flow rate of lift gas into the balloon envelope may cause damage to the envelope material because of "flagging" or rapid vibration of the envelope caused by the inflow of lift gas into and against the balloon envelope, as if experiencing high winds. The flagging of the balloon envelope material may fracture the balloon envelope film (such as LDPE or other envelope materials) at a molecular level increasing the creation of pinholes (i.e. leaks). In order to reduce the force from the inflow of lift gas, a diffuser may be used to help prevent the flagging of the balloon envelope.

Metal "probe" flow rate diffusers may take the form of a hollow metal tube (i.e. aluminum) with holes bored out to provide a flow path for the gas. A rapid flow rate of lift gas is produced by high pressure compressed gas cylinders of lift gas. The lift gas travels straight to the rounded end of the hollow metal tube and bounces back before exiting through the bored holes. This interruption of flow slows particles of the lift gas to protect the balloon envelope film from flagging as the envelope is inflated.

However, there are a number of drawbacks associated with such metal diffusers. Metal diffusers have microscopic "burrs" left behind during the machining process that can compromise the balloon envelope film as it abrades the balloon envelope film, thereby increasing the number of pinholes and scratches (i.e. leaks) in the balloon envelope film. Furthermore, metal fill systems are also constructed of rigid components that, when positioned within the soft balloon envelope film, can cause damage to the balloon envelope, especially during windy fill conditions. Moreover, fill systems at such a high flow rate become iced over due to the thermal properties of the lift gas and introduce frigid temperatures to the balloon envelope film. Temperature and moisture impact the performance of the balloon envelope film used for the balloon envelope making the balloon envelope more susceptible to pinholes or other damage (i.e. leaks). In addition, metal diffusers (i.e. aluminum) are heavy relative to the balloon envelope film and they require manual support supplied by additional personnel, or other rigging, during the inflation process. Due to the unpredictable nature of the inflation site, supporting the heavy metal diffuser may cause a safety risk for either the balloon envelope or the personnel involved in the inflation process.

Other attempts have been made to provide diffusers attached to the inside of the balloon envelope. However, such diffusers are positioned too close to the balloon envelope and may cause undesirable strain on the balloon envelope where they are attached In view of the foregoing, it would be useful to provide a diffuser for the high flow rate balloon inflation that does not have the drawbacks associated with metal probe diffusers, or diffusers that are attached to the inside of the balloon envelope.

Accordingly, in an example embodiment, a fabric diffuser is provided. As an initial matter, to reduce strain on the envelope from the weight of the diffuser and hosing, a high pressure hose may have one end attached to a tank of lift gas, such as helium or hydrogen, and the other end of the high pressure hose may be attached or reduced to a low pressure hose that is lighter and more flexible than the high pressure hose. A quick cutoff for gas fill may be located at the junction of the high and low pressure hoses. An end of the low pressure hose may be attached to a fill port positioned in the balloon envelope. In some embodiments the fill port can be located on a side of the balloon envelope, whereas in others it may be positioned on the top of the balloon envelope. The lighter, more flexible low pressure hose reduces the strain on the balloon envelope during the inflation process, and is easier for personnel to handle during the inflation process.

In one embodiment, an adapter may be provided that may be attached to an end of the low pressure hose. Clamps and silicone gasketing may be used to provide a gas tight seal between the end of the low pressure hose and the adapter. Quick releases and other couplings/fittings may be used as well to secure the adapter to the hose. The adapter may be a hollow, cylindrical member with a hollow threaded cap positioned over the cylindrical member. The threaded cap may be screwed onto the fill port where an O-ring within the cap may provide a gas tight seal. The cylindrical member of the adapter may extend through the fill port. A fill port may have an inner diameter of 2½ inches. Therefore the inner diameter of the cylindrical member of the adapter may be on the order of 2 inches.

The fabric diffuser may have a first section that is constructed of a non-porous, non-rigid fabric that extends through the adapter and is folded over onto a rear end of the adapter which may be positioned within the end of the low pressure hose and clamped into position with a zip tie or ratcheting strap. The first section of non-porous fabric may extend from the front end of the adapter (and into the balloon envelope) 3 or 4 inches. The first section of non-porous fabric may be comprised of ripstop nylon coated with silicone. The first section of non-porous material helps to direct the force of incoming lift gas inwards towards the center of the balloon envelope during inflation. The use of ripstop nylon also provides some structure to the diffuser without any rigid components.

The fabric diffuser may have a second section that is attached to the end of the first section. The second section may be constructed of a porous material through which the incoming lift gas passes through. The porous material disrupts and slows the flow of gas into the balloon envelope. The second section of porous material may be comprised of a mesh material, such as mosquito netting.

The first section of non-porous material may have a cylindrical shape that extends from the front end of the adapter, with a diameter or around 2 inches. The second section of porous material may extend from the first section and may also have a cylindrical shape with the same diameter as the first section, which allows the fabric diffuser to be more easily inserted and removed from the balloon envelope. The second section of porous material may also have other shapes. For example, the second section may have a bulbous, or spherical shape. In a preferred embodiment, the second section tapers into a sphere having a diameter of around 12 inches in an uninflated state, and forms a "light bulb" shape during inflation.

The second section of porous material may be formed by stitching together a first section of mesh with a second section of mesh. Each section could have several layers of mesh material. The non-rigid first and second sections of the diffuser do not cause damage to balloon envelope during the inflation as a rigid diffuser might. Furthermore, in some embodiments, the fabric diffuser can be built into the envelope and launched with the envelope. Alternately, the fabric diffuser could be removed after the envelope has been filled.

The porous fabric end may also have additional features to direct the flow of lift gas into the balloon envelope during inflation. For example, the number of layers of mesh could be changed so that additional layers of mesh are provided in the second section of porous material near the first section of non-porous material to continue directing more lift gas towards the end of the second section of the fabric diffuser.

The fabric diffuser may advantageously comprise non-rigid first and second sections that do not damage the balloon envelope during the inflation process, as a diffuser having rigid components could. Furthermore, the mesh material of the porous second section is not attached to and does not contact the balloon envelope during the end of the inflation process as the flow is directed towards the center of the balloon envelope, thereby helping to reduce or eliminate damage to the balloon envelope caused by flow of lift gas against the balloon envelope or by strain caused from attachment of the diffuser to the balloon envelope.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Example Balloon Configuration

Figure 2:
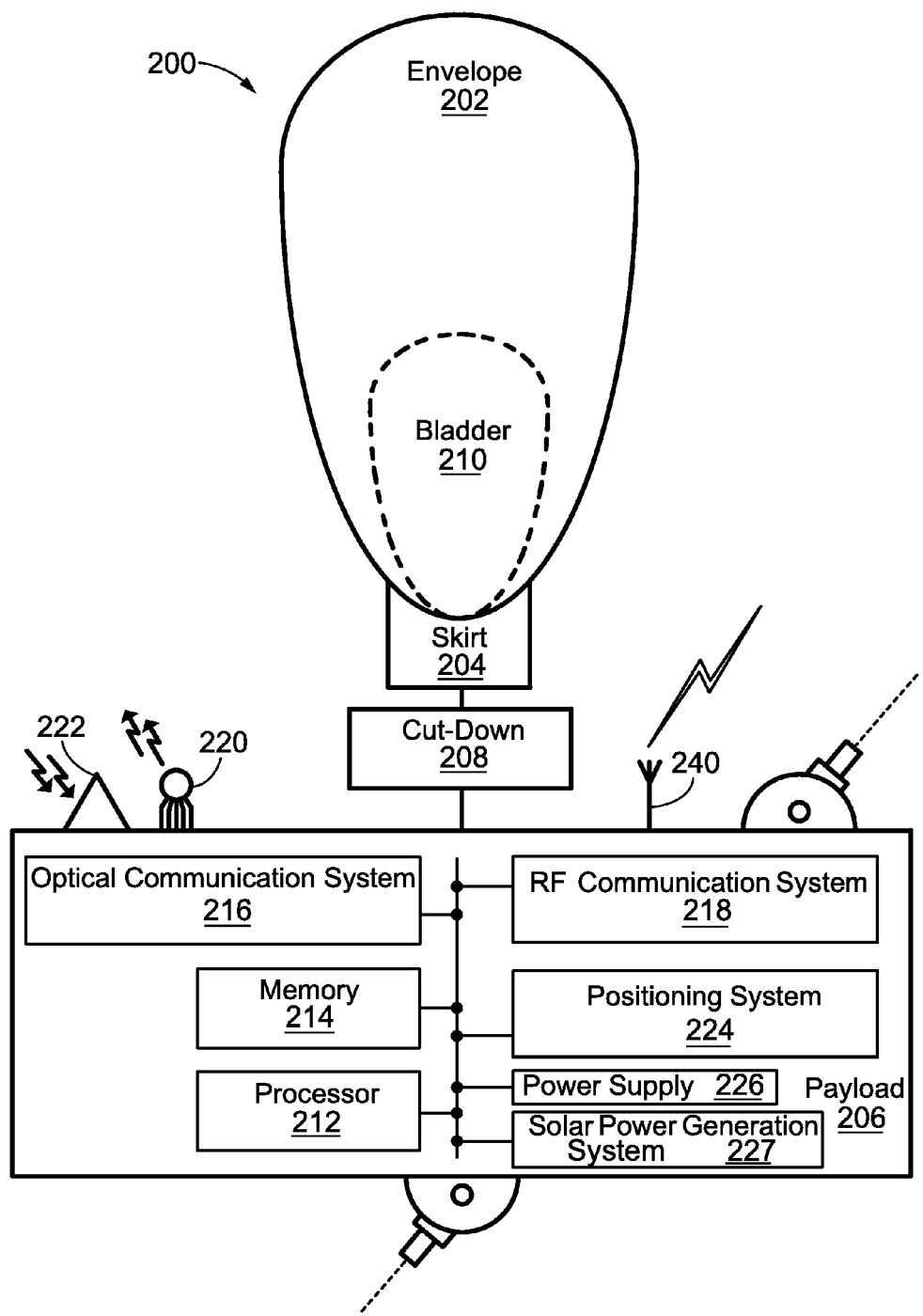
FIG. 2 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 2 shows a high-altitude balloon 200, according to an example embodiment. As shown, the balloon 200 includes an envelope 202, a skirt 204, a payload 206, and a cut-down system 208, which is attached between the balloon 202 and payload 204.

The envelope 202 and skirt 204 may take various forms, which may be currently well-known or yet to be developed. For instance, the envelope 202 and/or skirt 204 may be made of materials including metalized Mylar or BoPet. Additionally or alternatively, some or all of the envelope 202 and/or skirt 204 may be constructed from a highly-flexible latex material or a rubber material such as chloroprene. Other materials are also possible. Further, the shape and size of the envelope 202 and skirt 204 may vary depending upon the particular implementation. Additionally, the envelope 202 may be filled with various different types of gases, such as helium and/or hydrogen. Other types of gases are possible as well.

The payload 206 of balloon 200 may include a processor 212 and on-board data storage, such as memory 214. The memory 214 may take the form of or include a non-transitory computer-readable medium. The non-transitory computer-readable medium may have instructions stored thereon, which can be accessed and executed by the processor 212 in order to carry out the balloon functions described herein. Thus, processor 212, in conjunction with instructions stored in memory 214, and/or other components, may function as a controller of balloon 200.

The payload 206 of balloon 200 may also include various other types of equipment and systems to provide a number of different functions. For example, payload 206 may include an optical communication system 216, which may transmit optical signals via an ultra-bright LED system 220, and which may receive optical signals via an optical-communication receiver 222 (e.g., a photodiode receiver system). Further, payload 206 may include an RF communication system 218, which may transmit and/or receive RF communications via an antenna system 240.

The payload 206 may also include a power supply 226 to supply power to the various components of balloon 200. The power supply 226 could include a rechargeable battery. In other embodiments, the power supply 226 may additionally or alternatively represent other means known in the art for producing power. In addition, the balloon 200 may include a solar power generation system 227. The solar power generation system 227 may include solar panels and could be used to generate power that charges and/or is distributed by the power supply 226.

The payload 206 may additionally include a positioning system 224. The positioning system 224 could include, for example, a global positioning system (GPS), an inertial navigation system, and/or a star-tracking system. The positioning system 224 may additionally or alternatively include various motion sensors (e.g., accelerometers, magnetometers, gyroscopes, and/or compasses).

The positioning system 224 may additionally or alternatively include one or more video and/or still cameras, and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 200 includes an ultra-bright LED system 220 for free-space optical communication with other balloons. As such, optical communication system 216 may be configured to transmit a free-space optical signal by modulating the ultra-bright LED system 220. The optical communication system 216 may be implemented with mechanical systems and/or with hardware, firmware, and/or software. Generally, the manner in which an optical communication system is implemented may vary, depending upon the particular application. The optical communication system 216 and other associated components are described in further detail below.

In a further aspect, balloon 200 may be configured for altitude control. For instance, balloon 200 may include a variable buoyancy system, which is configured to change the altitude of the balloon 200 by adjusting the volume and/or density of the gas in the balloon 200. A variable buoyancy system may take various forms, and may generally be any system that can change the volume and/or density of gas in the envelope 202.

In an example embodiment, a variable buoyancy system may include a bladder 210 that is located inside of envelope 202. The bladder 210 could be an elastic chamber configured to hold liquid and/or gas. Alternatively, the bladder 210 need not be inside the envelope 202. For instance, the bladder 210 could be a rigid bladder that could be pressurized well beyond neutral pressure. The buoyancy of the balloon 200 may therefore be adjusted by changing the density and/or volume of the gas in bladder 210. To change the density in bladder 210, balloon 200 may be configured with systems and/or mechanisms for heating and/or cooling the gas in bladder 210. Further, to change the volume, balloon 200 may include pumps or other features for adding gas to and/or removing gas from bladder 210. Additionally or alternatively, to change the volume of bladder 210, balloon 200 may include release valves or other features that are controllable to allow gas to escape from bladder 210. Multiple bladders 210 could be implemented within the scope of this disclosure. For instance, multiple bladders could be used to improve balloon stability.

In an example embodiment, the envelope 202 could be filled with helium, hydrogen or other lighter-than-air material. The envelope 202 could thus have an associated upward buoyancy force. In such an embodiment, air in the bladder 210 could be considered a ballast tank that may have an associated downward ballast force. In another example embodiment, the amount of air in the bladder 210 could be changed by pumping air (e.g., with an air compressor) into and out of the bladder 210. By adjusting the amount of air in the bladder 210, the ballast force may be controlled. In some embodiments, the ballast force may be used, in part, to counteract the buoyancy force and/or to provide altitude stability.

In other embodiments, the envelope 202 could be substantially rigid and include an enclosed volume. Air could be evacuated from envelope 202 while the enclosed volume is substantially maintained. In other words, at least a partial vacuum could be created and maintained within the enclosed volume. Thus, the envelope 202 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 202 could be a first color (e.g., black) and/or a first material from the rest of envelope 202, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 202 as well as the gas inside the envelope 202. In this way, the buoyancy force of the envelope 202 may increase. By rotating the balloon such that the second material is facing the sun, the temperature of gas inside the envelope 202 may decrease. Accordingly, the buoyancy force may decrease. In this manner, the buoyancy force of the balloon could be adjusted by changing the temperature/volume of gas inside the envelope 202 using solar energy. In such embodiments, it is possible that a bladder 210 may not be a necessary element of balloon 200. Thus, in various contemplated embodiments, altitude control of balloon 200 could be achieved, at least in part, by adjusting the rotation of the balloon with respect to the sun.

Further, a balloon 206 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 200 also includes a cut-down system 208. The cut-down system 208 may be activated to separate the payload 206 from the rest of balloon 200. The cut-down system 208 could include at least a connector, such as a balloon cord, connecting the payload 206 to the envelope 202 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 206 away from the envelope 202.

The cut-down functionality may be utilized anytime the payload needs to be accessed on the ground, such as when it is time to remove balloon 200 from a balloon network, when maintenance is due on systems within payload 206, and/or when power supply 226 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Illustrative Examples of a Balloon Inflation Diffuser

As disclosed in the FIGS. 3-10, example embodiments of a balloon inflation diffuser is provided wherein the balloon inflation diffuser may include a non-rigid first section that extends into the balloon envelope that is attached to a porous and non-rigid second section that extends further into the balloon envelope to provide a flow of lift gas into the balloon envelope that is positioned away from the balloon envelope material to help prevent damage to the balloon envelope during the balloon inflation process.

Figure 3A:
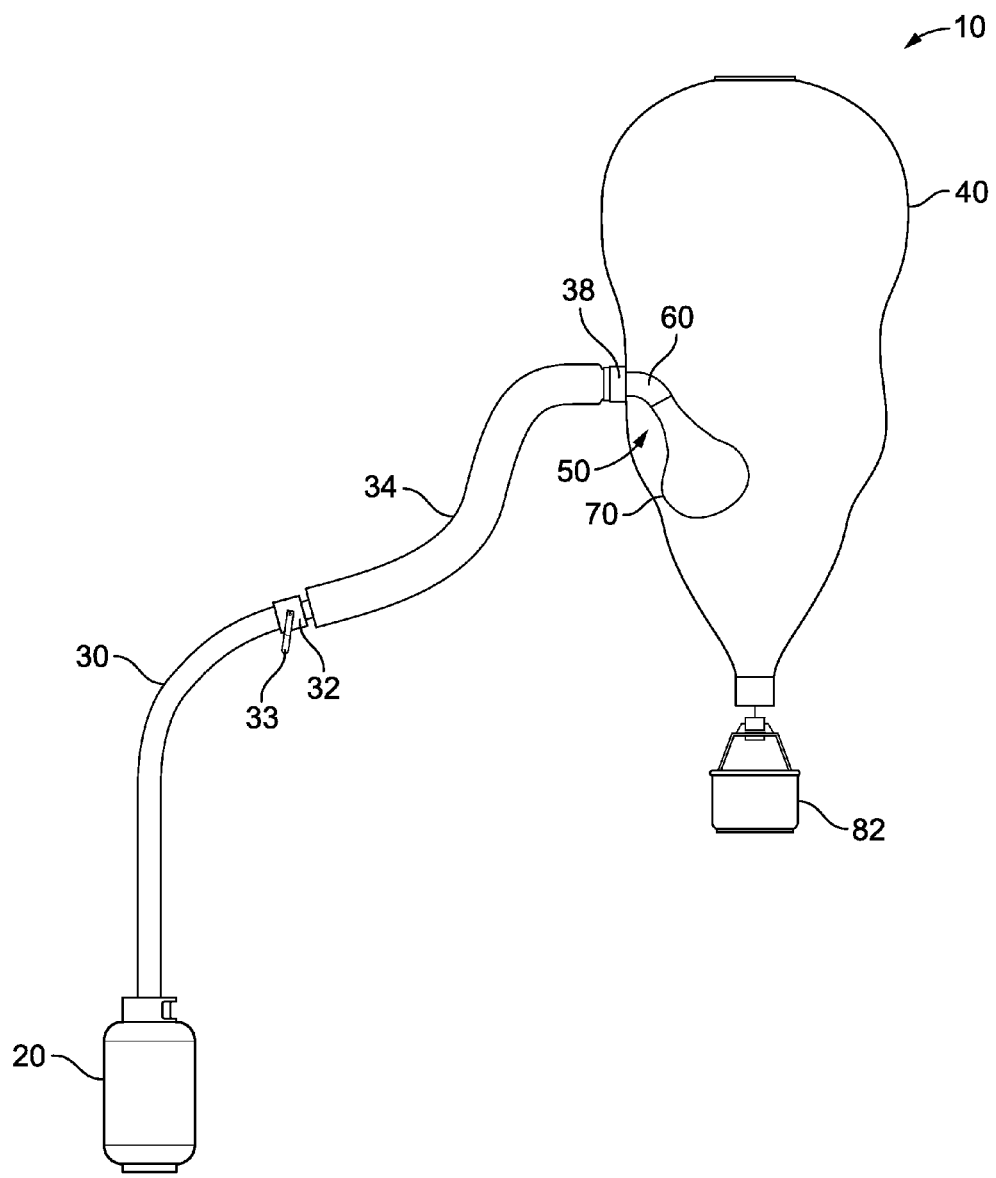
FIG. 3A shows a perspective, partial cross sectional view of balloon 10 having balloon inflation diffuser 50 positioned within balloon envelope 40 prior to inflation, according to an example embodiment.

FIG. 3A shows a perspective, partial cross sectional view of balloon 10 having balloon inflation diffuser 50 positioned within balloon envelope 40 prior to inflation. To reduce strain on the envelope 40 from the weight of the diffuser and hosing, a high pressure hose 30 having a rating of 4000 psi may have one end attached to a tank of lift gas 20, such as helium or hydrogen, and the other end of the high pressure hose 30 may be attached or reduced to a low pressure hose 34 that is lighter and more flexible than the high pressure hose 34. A quick cutoff for gas fill 33 may be located at the junction 32 of the high and low pressure hoses 30, 34. An end of the low pressure hose 34 may be attached to a fill port positioned in the balloon envelope 40. In some embodiments the fill port can be located on a side of the balloon envelope (as illustrated in FIG. 3A), whereas in others it may be positioned on the top (or bottom) of the balloon envelope 40. The lighter, more flexible low pressure hose 34 reduces the strain on the balloon envelope 40 during the inflation process, and is easier for personnel to handle during the inflation process.

Figure 3B:
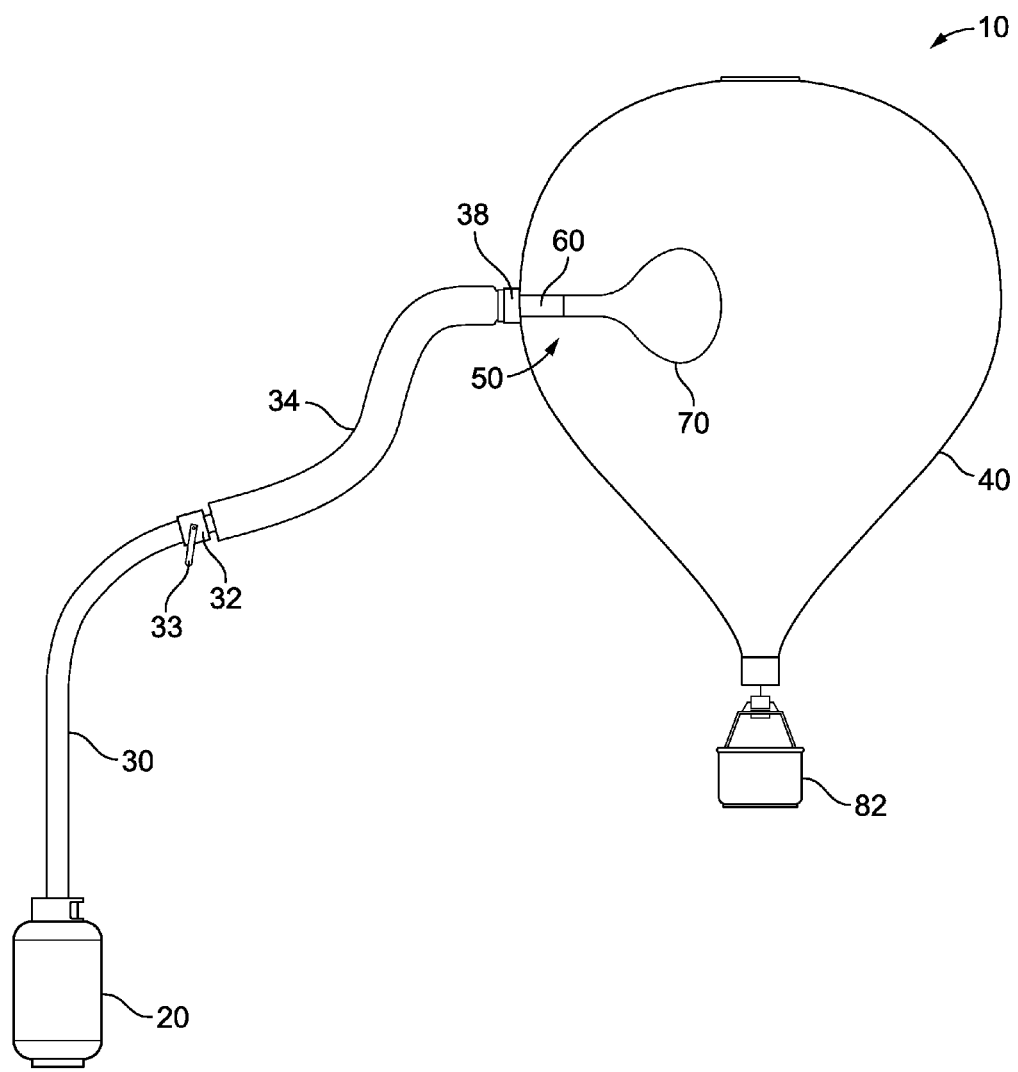
FIG. 3B shows a perspective, partial cross sectional view of balloon 10 shown in FIG. 3A at the end of an inflation process.

In FIG. 3A, the inflation diffuser 50 is shown within the balloon envelope 40 prior to inflation. In particular, inflation diffuser 50 includes a non-rigid first section 60 and a second porous and non-rigid section 70 shown in an unpressurized condition prior to inflation. FIG. 3B shows a perspective, partial cross sectional view of balloon 10 shown in FIG. 3A at the end of an inflation process. In FIG. 3B, lift gas if flowing through the balloon inflation diffuser 50 towards the center of balloon envelope 40 where it exits the porous second section 70 of the diffuser 50 at a point away from the balloon envelope 40.

Figure 4:
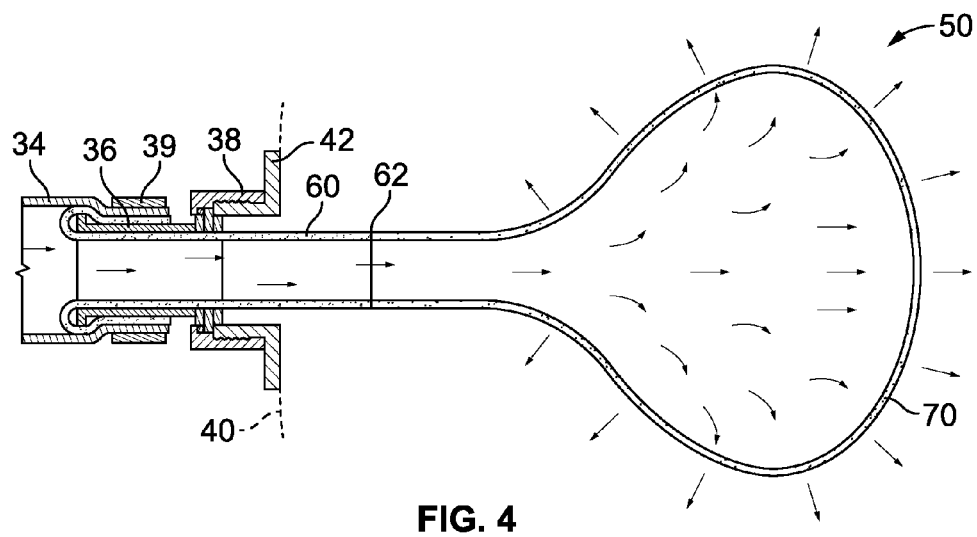
FIG. 4 shows a cross sectional view of balloon diffuser 50 shown in FIGS. 3A and 3B having a first non-rigid section 60 and a porous and non-rigid second section 70 having a light bulb shape comprised of mesh material, according to an example embodiment.

FIG. 4 shows a cross sectional view of balloon diffuser 50 shown in FIGS. 3A and 3B having a first non-rigid section 60 and a porous and non-rigid second section 70 having a light bulb shape comprised of mesh material. In an example embodiment, an adapter 36 (shown in detail in FIGS. 7 and 8) may be provided that may be attached to an end of the low pressure hose 34 and to the non-rigid first section 60 of the balloon inflation diffuser 50. Clamp 39 and silicone gasketing may be used to provide a gas tight seal between the end of the low pressure hose 34 and the adapter 36. The adapter 36 may be a hollow, cylindrical member with a hollow threaded cap 38 positioned over the cylindrical member 36. The threaded cap 38 may be screwed onto the fill port 42 where an O-ring within the cap 38 may provide a gas tight seal. The cylindrical member of the adapter may extend through the fill port in some embodiments. A fill port 42 may have an inner diameter of 2½ inches. Therefore the inner diameter of the cylindrical member of the adapter 36 may be on the order of 2 inches.

As shown in FIG. 4, lift gas (represented by arrows) is shown flowing through low pressure hose 34, into non-rigid first section 60, and into porous non-rigid second section 70 where the gas exits the porous and non-rigid second section 70 towards the center of the balloon envelope 40. In an example embodiment shown in FIG. 4, the non-rigid first section 60 may have a cylindrical shape that extends from the front end of the adapter 36, with a diameter or around 2 inches. The porous and non-rigid second section 70 may extend from the first section 60 at transition point 62 and may have a round light bulb shape that gradually tapers from transition point 62 into a spherical member. The light bulb cross sectional shape may have a spherical portion with a diameter of around 12-18 inches in an uninflated state, and may extend 18 inches from the transition point 62. The spherical second section 70 shown in FIG. 4 may serve to effectively distribute the flow of lift gas into the balloon envelope 40 away from the wall of the balloon envelope 40 to help prevent damage to the balloon envelope during the inflation process, and extend further into the balloon envelope than the second section 80 shown in FIG. 5.

Figure 5:
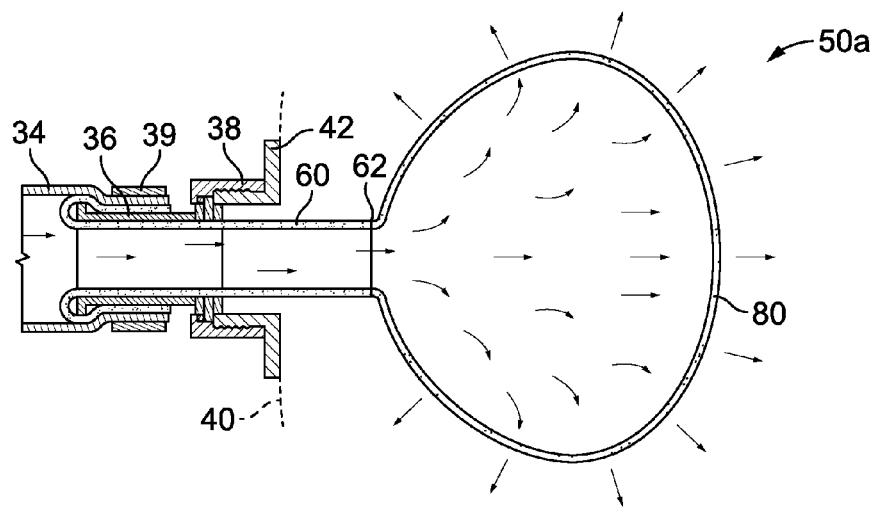
FIG. 5 shows a cross sectional view of balloon diffuser 50a having a first non-rigid section 60 and a porous and non-rigid second section 80 having a round shape comprised of mesh material, according to an example embodiment.

FIG. 5 shows a cross sectional view of balloon diffuser 50a having a first non-rigid section 60 and a porous and non-rigid second section 80 having a round shape comprised of mesh material, according to an example embodiment. As shown in FIG. 5, lift gas (represented by arrows) is shown flowing through low pressure hose 34, into non-rigid first section 60, and into porous non-rigid second section 80 where the gas exits the porous and non-rigid second section 80 towards the center of the balloon envelope 40. In an example embodiment shown in FIG. 5, the non-rigid first section 60 may have a cylindrical shape that extends from the front end of the adapter 36, with a diameter or around 2 inches. The porous and non-rigid second section 80 may extend from the first section 60 at transition point 62 and may also have a round cross sectional shape, with a diameter of around 12 inches in an uninflated state. The spherical second section 80 shown in FIG. 80 may serve to effectively distribute the flow of lift gas into the balloon envelope 40 away from the wall of the balloon envelope 40 to help prevent damage to the balloon envelope during the inflation process.

Figure 6:
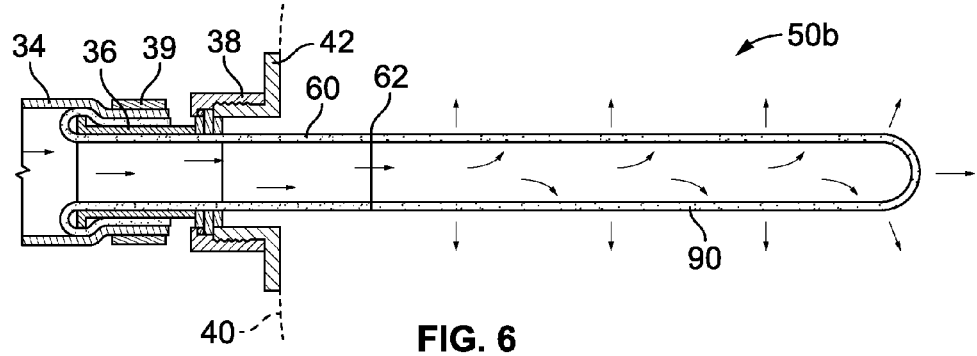
FIG. 6 shows a cross sectional view of balloon diffuser 50b having a first non-rigid section 60 and a porous and non-rigid second section 90 having a tubular shape comprised of mesh material.

FIG. 6 shows a cross sectional view of balloon diffuser 50b having a first non-rigid section 60 and a porous and non-rigid second section 90 having a tubular shape comprised of mesh material. As shown in FIG. 6, lift gas (represented by arrows) is shown flowing through low pressure hose 34, into non-rigid first section 60, and into porous and non-rigid second section 90 where the gas exits the porous non-rigid second section 80 towards the center of the balloon envelope 40. In an example embodiment shown in FIG. 6, the non-rigid first section 60 may have a cylindrical shape that extends from the front end of the adapter 36, with a diameter or around 2 inches. The porous and non-rigid second section 90 may extend from the first section 60 at transition point 62 and may also have a cylindrical shape with the same diameter as the first section 60, which allows the fabric diffuser 50 to be more easily inserted and removed from the balloon envelope 40.

The balloon inflation diffuser 50, 50a, and 50b (which may also be referred to as a fabric diffuser) may advantageously comprise non-rigid first and second sections that do not damage the balloon envelope during the inflation process, as a diffuser having rigid components could. Furthermore, the mesh material of the porous second section (50, 50a, and 50b) is not attached to and does not contact the balloon envelope 40 during the end of the inflation process as the flow of lift gas is directed towards the center of the balloon envelope 40, thereby helping to reduce or eliminate damage to the balloon envelope 40 caused by flow of lift gas against the balloon envelope 40 or by strain caused by attachment of the diffuser to the balloon envelope 40.

Figure 7:
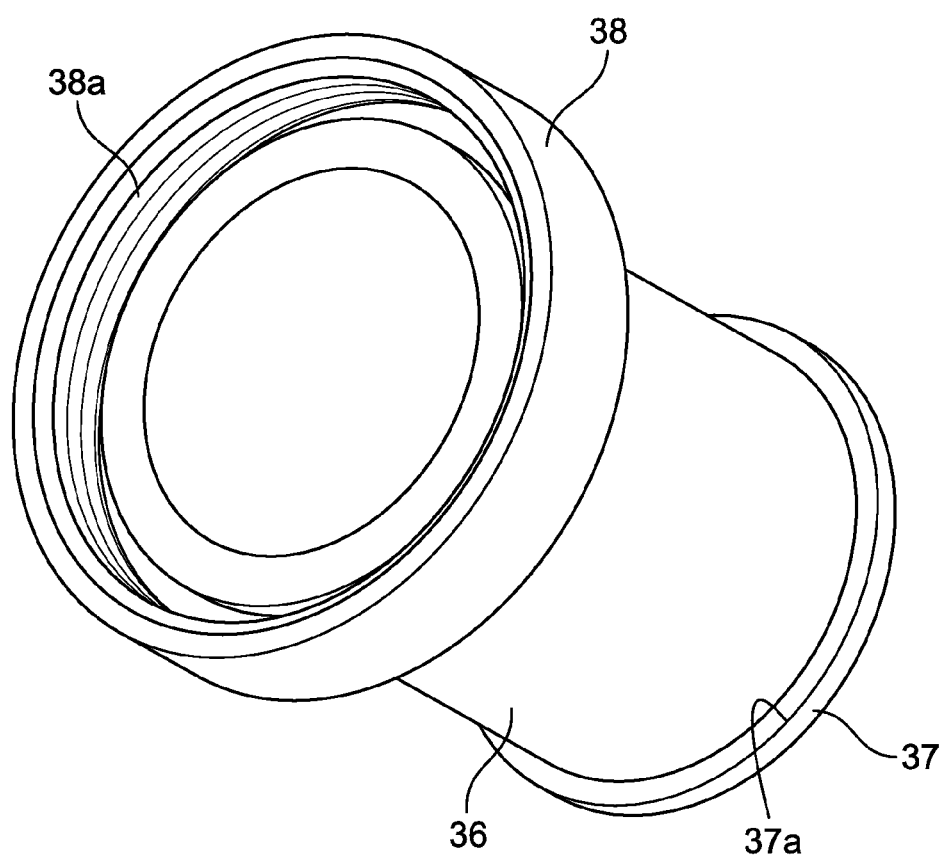
FIG. 7 shows a perspective view of an adapter 36 comprised of a tubular member and a hollow cap member 38 having threads adapted for attachment to a fill port, according to an example embodiment.

FIG. 7 shows a perspective view of an adapter 36 comprised of a tubular member and a hollow cap member 38 having inner threads 38a adapted for attachment to the external threads 42a of a fill port 42 (shown in FIG. 9), according to an example embodiment. Adapter 36 has a first raised circular flange 37 having an inner facing surface 37a. The raised circular flange 37 may prevent a strap 39 (shown in FIG. 9) used to attach low pressure hose 34 to adapter 36 from slipping off of the outer surface of adapter 36. The hollow cap member 38 may pass over the circular flange 37 so that it may screw onto the external threads 42a of fill port 42 as shown in FIG. 9.

Figure 8:
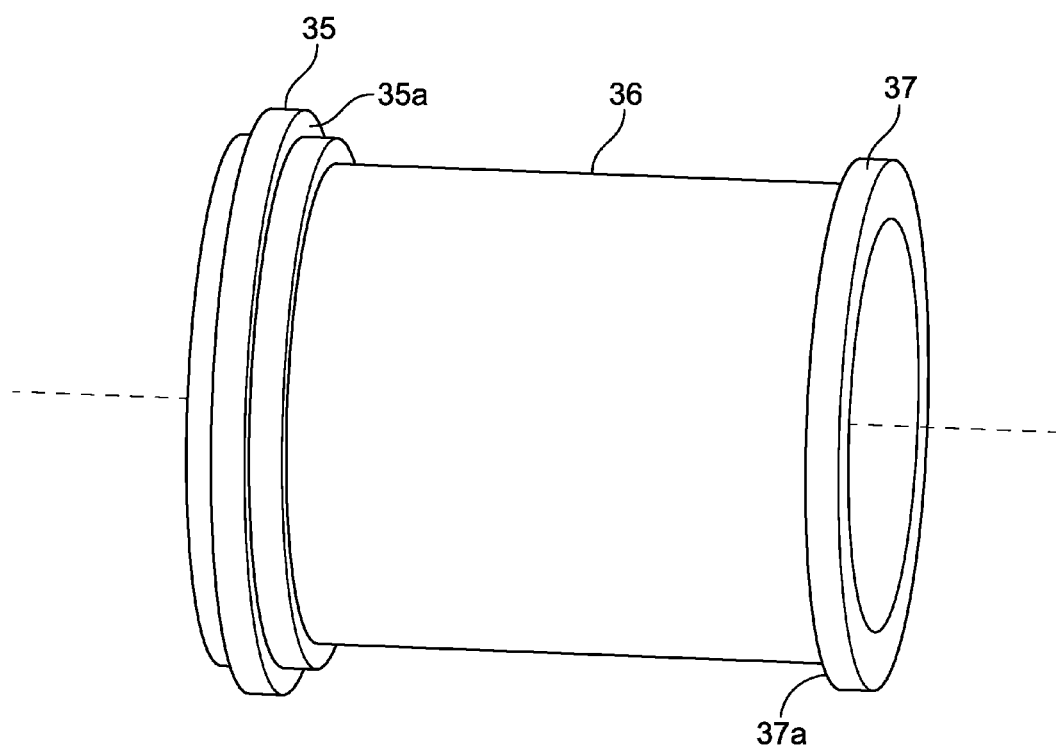
FIG. 8 shows a perspective view of adapter 36 shown in FIG. 7.

FIG. 8 shows a perspective view of adapter 36 shown in FIG. 7. Adapter 36 has a first raised circular flange 37 having an inner facing surface 37a. The raised circular flange 37 may prevent a strap 39 (shown in FIG. 9) used to attach low pressure hose 34 to adapter 36 from slipping off of the outer surface of adapter 36. The opposite end of adapter 36 has a raised circular flange 35 having an inward facing surface 35a. An O-ring 33 may be positioned between inward facing surface 35a and outer facing surface 38a of hollow cap member 38 (as shown in FIG. 9) to provide a gastight seal when the hollow cap member 38 is screwed onto the fill port 42. Adapter 36 and hollow cap member 38 may be made of a rigid material, such as a hard plastic or metal, and may be formed by a 3-D printing process.

Figure 9:
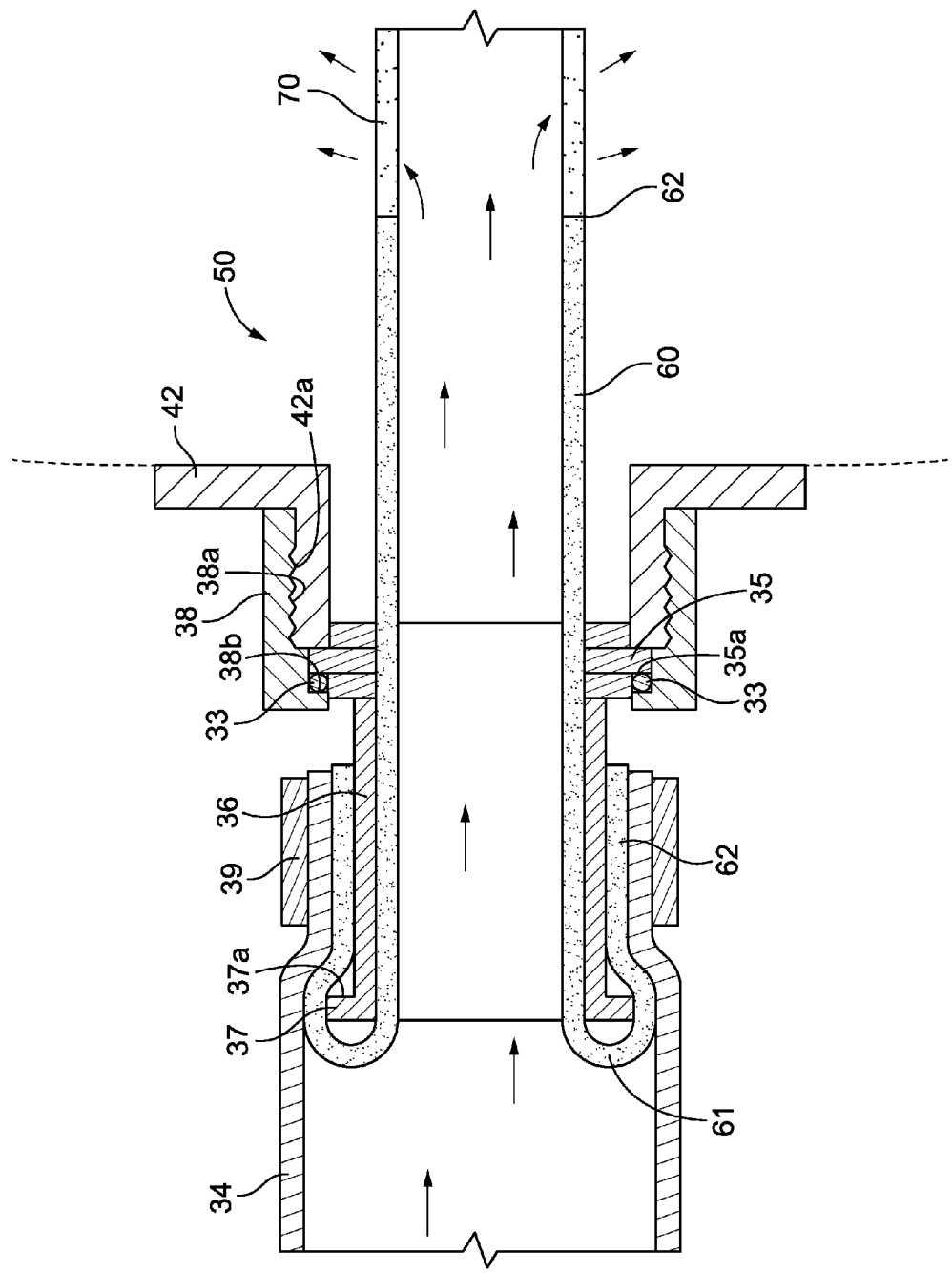
FIG. 9 shows a cross sectional view of balloon inflation diffuser 50 as lift gas flows through low pressure hose 34, non-rigid first section 60, adapter 36, and porous and non-rigid section 70, and into balloon envelope 40.

FIG. 9 shows a cross sectional view of balloon inflation diffuser 50 shown in FIG. 4 as lift gas (represented by arrows) flows through low pressure hose 34, non-rigid first section 60, adapter 36, and porous and non-rigid section 70, and into balloon envelope 40. The balloon inflation diffuser 50 may have a first section 60 that is constructed of a non-porous, non-rigid fabric that extends through the adapter 36 and has portion 61 that is folded over circular flange 37 onto an outer surface of adapter 36. Folded over portion 62 of the first section 60 may be positioned within the end of the low pressure hose 34 and clamped into position with a zip tie or ratcheting strap 39.

The hollow cap member 38 has inner threads 38a threaded onto outer threads 42a on fill port 42. O-ring 33 is positioned between inner surface 38b of hollow cap member 38 and inner facing surface 35a of circular flange 35 of adapter 36 to provide a gastight seal.

The non-rigid first section 60 may be made of non-porous fabric and may extend from the front end of the adapter 36 and into the balloon envelope for 3 or 4 inches. The non-rigid first section 60 may be constructed of ripstop nylon coated with silicone that is non-porous. The non-rigid first section 60 that is non-porous helps to direct the force of incoming lift gas inwards towards the center of the balloon envelope 40 during inflation. The use of ripstop nylon also provides some structure to the diffuser without any rigid components.

Non-rigid first section 60 of fabric diffuser 50 is preferably non-porous. However, in some embodiments some level of porosity in the non-rigid first section 60 may be utilized, although the non-rigid first section 60 should be less porous than the porous and non-rigid second sections 70, 80, or 90 shown in FIGS. 4-6.

As shown in FIG. 9, the balloon inflation diffuser 50 may have a second section 70 that is attached to the end of the first section 60 at transition point 62. The second section 70 may be constructed of a porous material through which the incoming lift gas passes through.

The porous material disrupts and slows the flow of gas into the balloon envelope 40. The second section 70 (as well as 80 and 90) of porous material may be comprised of a mesh material, such as mosquito netting. In a preferred embodiment, the porous material is constructed of several layers of elastic mesh material, such as Power Mesh available from Seattle Fabrics, having openings on the order of one millimeter in diameter. The elastic mesh material stretches slightly during inflation.

The second section of porous material 70, 80, or 90 shown in FIGS. 4-6 may be formed by stitching together a first section of mesh with a second section of mesh. Each section could have several layers of mesh material. A coverlock stitch may be used when stitching the first section together with the second section. The porous and non-rigid second section 70, 80, or 90 shown in FIGS. 4-6 may be attached to the non-rigid first section 60 using an overlock stitch with a zig zag top stitch.

The porous and non-rigid end 70, 80, or 90 shown in FIGS. 4-6 may also have additional features to direct the flow of lift gas into the balloon envelope during inflation. For example, the number of layers of mesh could be changed so that additional layers of mesh are provided in the second section of porous material near the first section of non-porous material to continue directing more lift gas towards the end of the second section of the diffuser 50.

In addition, a non-porous cap or thicker portion at the end of the diffuser 50 could be used to further redirect the flow of the lift gas and reduce the amount of lift gas exiting at the tip of the diffuser.

In some embodiments, the fabric diffuser can be built into the envelope at the fill port or attached to the underside of a temporary fill cap. The use of a permanent, internal diffuser could reduce the manpower required during the inflation process. Furthermore, where hydrogen is used as the fill gas, the first and second sections of the diffuser should contain anti-static additives.

4. Example Method of Inflating a Balloon Envelope

Figure 10:
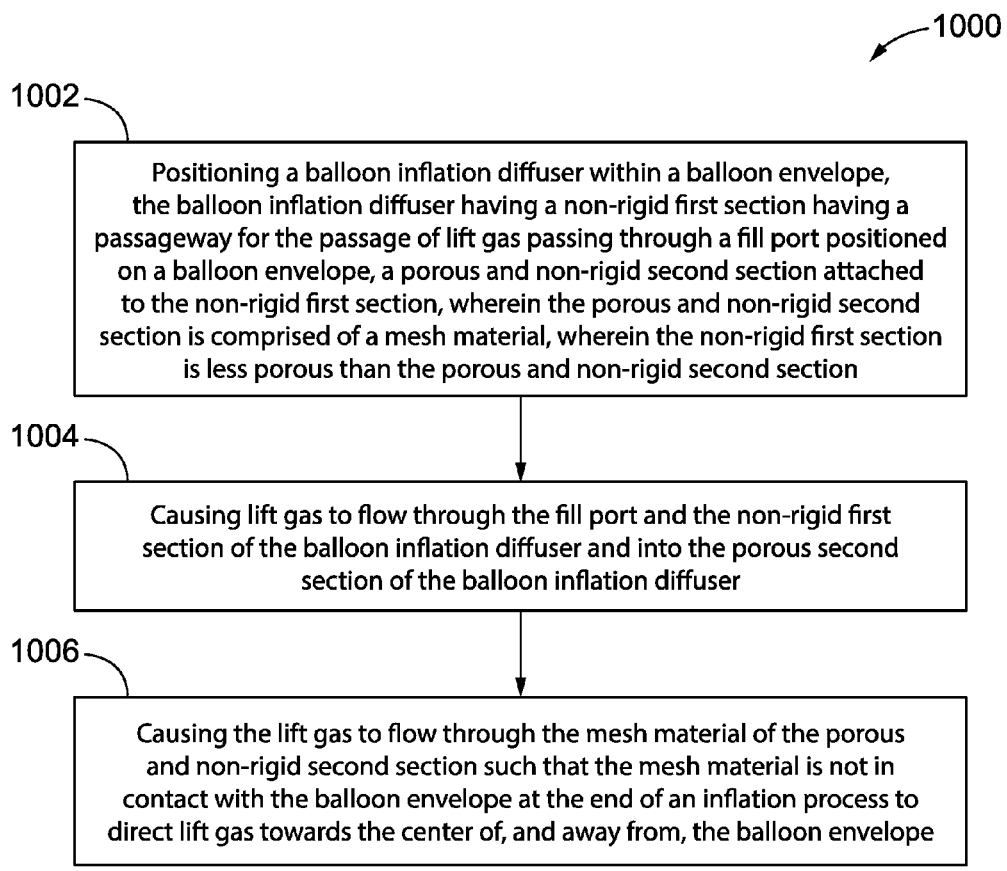
FIG. 10 is a method, according to an example embodiment.

FIG. 10 shows a method 1000 that may be used for inflating a balloon envelope. Method 1000 is provided that includes the step 1002 of positioning a balloon inflation diffuser within a balloon envelope, the balloon inflation diffuser having a non-rigid first section having a passageway for the passage of lift gas passing through a fill port positioned on a balloon envelope, a porous and non-rigid second section attached to the non-rigid first section, wherein the porous and non-rigid second section is comprised of a mesh material, wherein the non-rigid first section is less porous than the porous and non-rigid second section.

Method 1000 further includes step 1004 of causing lift gas to flow through the fill port and the non-rigid first section of the balloon inflation diffuser and into the porous second section of the balloon inflation diffuser, and step 1006 of causing the lift gas to flow through the mesh material of the porous and non-rigid second section such that the mesh material is not in contact with the balloon envelope at the end of an inflation process to direct lift gas towards the center of, and away from, the balloon envelope.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An inflation diffuser comprising:
a non-rigid first section having a passageway for the passage of lift gas passing through a fill port positioned on a balloon envelope;
a porous and non-rigid second section attached to the non-rigid first section;
wherein the porous and non-rigid second section is comprised of an elastic a mesh material;
wherein the non-rigid first section is less porous than the porous and non-rigid second section;
wherein the porous and non-rigid second section is not in contact with the balloon envelope at the end of an inflation process to direct lift gas towards the center of, and away from, the balloon envelope; and
wherein a first end of the first section is secured to an adapter positioned within the fill port; and
wherein the first end of the first section extends through the adapter and is folded over onto an exterior surface of the adapter.

2. The inflation diffuser of claim 1, wherein the non-rigid first section is non-porous.

3. The inflation diffuser of claim 2, wherein the first section is comprised of ripstop nylon coated with silicone.

4. The inflation diffuser of claim 1, wherein the first section extends 3 inches or more within the balloon envelope.

5. The inflation diffuser of claim 1, wherein the mesh material is comprised of an elastic mesh netting.

6. The inflation diffuser of claim 1, wherein the porous and non-rigid second section is comprised of two or more layers of elastic mesh netting.

7. The inflation diffuser of claim 1, wherein the porous and non-rigid second section extends from the non-rigid first section in a tubular shape, and a diameter of the first section is the same as a diameter of the second section.

8. The inflation diffuser of claim 1, wherein the mesh material comprises holes having a diameter on the order of 1 millimeter in size.

9. The inflation diffuser of claim 1, wherein the porous and non-rigid second section has a round shape.

10. The inflation diffuser of claim 9, wherein the porous and non-rigid second section has a diameter of 12 inches or more in an uninflated state.

11. The inflation diffuser of claim 1, wherein the porous and non-rigid second section gradually tapers into a spherical shape that extends 12-18 inches from an end of the non-rigid first section.

12. The inflation diffuser of claim 1, wherein a threaded ring is positioned over the adapter and is adapted for threaded engagement with the fill port.

13. The inflation diffuser of claim 1, wherein an end of the adapter is secured to a low pressure hose.

14. The inflation diffuser of claim 13, wherein the low pressure hose is secured to a high pressure hose that is in communication with a supply of lift gas.

15. The inflation diffuser of claim 1, wherein the first section is permanently secured to the fill port.

16. The inflation diffuser of claim 1, wherein the first section is secured to a fill port cap.

17. An inflation diffuser comprising:
a non-porous and non-rigid first section having a passageway for the passage of lift gas passing through a fill port positioned on a balloon envelope, the first section extending three inches or more within the balloon envelope;
a porous and non-rigid second section attached to the first section;
wherein the second section is comprised of an elastic mesh material that comprises holes having a diameter on the order of 1 millimeter in size;
wherein the second section has a round shape having a diameter of 12 inches or more in an uninflated state;
wherein the porous and non-rigid second section is not in contact with the balloon envelope at the end of an inflation process to direct lift gas towards the center of, and away from, the balloon envelope; and
wherein a first end of the first section is secured to an adapter positioned within the fill port; and
wherein the first end of the first section extends through the adapter and is folded over onto an exterior surface of the adapter.

18. A method of inflating a balloon envelope comprising the steps of:
positioning an inflation diffuser within a balloon envelope, the inflation diffuser including a non-rigid first section having a passageway for the passage of lift gas passing through a fill port positioned on a balloon envelope, a porous and non-rigid second section attached to the non-rigid first section, wherein the porous and non-rigid second section is comprised of a mesh material, wherein the non-rigid first section is less porous than the porous and non-rigid second section, wherein the porous and non-rigid second section is not in contact with the balloon envelope at the end of an inflation process to direct lift gas towards the center of, and away from, the balloon envelope, wherein a first end of the first section is secured to an adapter positioned within the fill port; and wherein the first end of the first section extends through the adapter and is folded over onto an exterior surface of the adapter;

causing lift gas to flow through the fill port and the non-rigid first section of the inflation diffuser and into the porous second section of the inflation diffuser; and causing the lift gas to flow through the mesh material of the porous and non-rigid second section such that the mesh material is not in contact with the balloon envelope at the end of an inflation process to direct lift gas towards the center of, and away from, the balloon envelope.

19. The method of claim 18, wherein the non-rigid first section is non-porous.

* * * * *